United States Patent Office 3,379,694
Patented Apr. 23, 1968

3,379,694
SULFATED COPOLYMERS OF UREA AND DIOLEFINS AND PROCESS FOR PRODUCING SAME
Thomas Franklin Rutledge, Wilmington, Del., assignor to Atlas Chemical Industries, Inc., Wilmington, Del., a corporation of Delaware
No Drawing. Continuation-in-part of application Ser. No. 339,587, Jan. 23, 1964. This application Dec. 17, 1964, Ser. No. 419,201
11 Claims. (Cl. 260—77.5)

ABSTRACT OF THE DISCLOSURE

Sulfated copolymers of ureas and diolefins are prepared by reacting 1,3-butadiene, or a homologue thereof substituted in the 2-position with an n-alkyl radical containing up to 3 carbon atoms, with urea in the presence of sulfuric acid. Alternatively, part of the diolefin may be replaced by a compound reactive towards urea-$NH_2$ by alkylation or towards the double bonds of the formed intermediate urea-diolefin adducts. Typically, urea and concentrated aqueous sulfuric acid in mol proportions of 1:1.5 are suspended in an inert solvent and, under vigorous agitation, 1.5 molar proportion of diolefin are gradually introduced at 10 to 20° C. over a period of several hours. The recovered sulfated urea-butadiene copolymer, in the form of its sodium salt is a useful detergent component.

This application is a continuation-in-part of application Ser. No. 339,587, filed Jan. 23, 1964, now abandoned.

This invention relates to unsaturated, nitrogen-containing polymeric products and to a method for preparing them. More particularly it relates to the preparation of condensation products from urea, a diolefin and sulfuric acid; and copolymers from urea, a diolefin, a tertiary mono-olefin and sulfuric acid, respectively; and to the products so prepared.

It is well known that tertiary mono-olefins will undergo addition reaction at low temperatures with urea in the presence of concentrated sulfuric acid to yield N-tertiary alkyl and N,N'-ditertiary alkyl ureas. Non-tertiary olefins, in general, are not reactive toward urea under these conditions.

It has now been discovered that certain diolefins, when brought into contact with urea in the presence of sulfuric acid, react in a manner not predictable from the behavior of monoolefins towards urea and, in accordance with the present invention, urea-diolefin-sulfuric acid condensates are prepared by reacting 1,3-butadiene, or a homologue thereof substituted in the 2-position with an n-alkyl radical containing up to 3 carbon atoms, with urea in the presence of sulfuric acid. It has further been found that the properties of the formed polymers may be modified by the introduction of other olefinic compounds reactive either with urea by alkylation or with unsaturated compounds by the Diels-Alder reaction and such modified polymers are within the scope of the invention, as is also their method of preparation. The polymeric products formed contain in addition to sulfate groups, a plurality of residues from diolefin per urea residue.

The reaction conditions under which the polymeric products of the invention are prepared are similar to those mentioned above for alkylating urea with tertiary mono-olefins and it is quite unexpected to find the secondary olefinic groups of 1,3-butadiene and its homologues adding onto urea, frequently replacing both hydrogens of a single urea nitrogen, and undergoing polymerization reaction. It is further surprising to find, under the mild reaction conditions employed, that significant proportions of sulfuric acid are taken up in the polymer. It appears to be in the form of a sulfate half ester so that the polymers are acidic in character and can form salts.

The diolefins which have been found to undergo this unexpected polymerizing reaction with urea are 4- to 7-carbon acyclic 1,3-diolefins containing only terminal carbon to carbon double bonds and branched at no more than one carbon atom. Compounds so defined include 1,3-butadiene, isoprene, 2-ethyl butadiene-1,3, and 2-n-propyl-butadiene-1,3.

Useful modifications of the polymers of the invention are obtained when part of the diolefin is replaced by a compound reactive toward urea-$NH_2$ by alkylation or toward the double bonds of the formed intermediate urea-diolefin adducts. Such modifiers include unhindered tertiary mono-olefins and conjugated dienes other than the 1,3-diolefins above-defined. Preferred modifiers are unhindered tertiary mono-olefins containing from 4 to 8 carbon atoms. For purposes of this application, an unhindered tertiary mono-olefin is defined as one in which the carbon atoms alpha, beta, and gamma to the tertiary olefinic carbon atom are free of side chain carbon.

Instead of urea itself, ureas containing at least one —$NH_2$ group attached directly to carbonyl, i.e., mono-N-substituted ureas such as N-methyl urea, N-phenyl urea and N-butyl urea, may be employed in forming polymers in accordance with the invention. Likewise urea derivatives which regenerate urea under the reaction conditions may serve as the source of urea.

In broad terms the process by which the polymers of the invention are prepared comprises the addition of a diolefin as above defined to a suspension of a mixture of a urea and sulfuric acid in an inert organic diluent and recovering the formed polymer from the unreacted components and by-products such as diolefin oligomer and low-molecular weight, water-soluble urea-diolefin-sulfuric acid condensation products which latter products will be referred to herein as prepolymers. Unreacted components, diluent and prepolymers may, if desired, be recovered and recycled to the reactor with fresh reactants for the preparation of additional polymer.

The diluent in which the polymerization is carried out must be inert to the concentrated acid and other polymerizing components. Saturated aliphatic, cycloaliphatic or aromatic hydrocarbons, and halogenated derivatives of such hydrocarbons particularly chlorinated or fluorinated derivatives, have been found satisfactory. Separation of diluent from the formed polymer and reaction products is facilitated if the diluent is readily distillable and for this reason diluents boiling at temperatures not to exceed 100° C. at ordinary pressures are preferred. Methylene chloride and cyclohexane have been found particularly satisfactory in the process and are the preferred diluents for carrying out the polymerization.

The polymerization proceeds satisfactorily when the concentration of sulfuric acid admixed with urea in forming the urea-sulfuric acid suspension ranges from about 85% to 105% by weight of equivalent $H_2SO_4$. Optimum results have been obtained with acid concentrations of from 92 to 98% by weight and it is preferred to employ acid in this concentration range.

Polymers in accordance with the invention are obtainable if the molar proportion of sulfuric acid to urea employed ranges upward from 0.75. At somewhat higher molar ratios, i.e. at from about 1.0 to 2.0 molar proportions of sulfuric acid per mol of urea, the polymerization is more efficient and it is preferred to operate in this range. With further increase in the molar ratio of acid to urea the gain in conversion is less pronounced and ratios greater than 3.0 are generally undesirable. Although the polymerization occurs in the presence of excessive quantities of acid the burden in recovery of product and recycling of reactants is increased with little concomitant gain in conversion or yield.

Considerable heat is evolved on mixing the sulfuric acid and urea. Conveniently, finely ground urea is suspended in the diluent to be employed and sulfuric acid added gradually with good agitation and cooling to prevent excessive temperature rise. The resulting suspension is adjusted to the desired reaction temperature which may suitably be at any value between about $-10°$ C. and $70°$ C., preferably between $10°$ and $45°$ C., and the selected diolefin introduced gradually with vigorous agitation while controlling the system in the desired temperature range. The addition is continued until from 0.8 to 10.0 and preferably from 1.5 to 5.0 mols of diolefin per mol of urea have been introduced, the rate of addition being adjusted so that the entire quantity is added in a period of from 0.5 to 6.0 hours.

Reaction between diolefin and urea is rapid and is virtually complete as soon as all the diolefin has been added. The reaction mixture is usually stirred a short time after all the components have been added to insure formation of as much polymer as possible.

The reaction mixture at this stage contains the sought urea-diolefin-sulfuric acid polymer; unreacted urea, sulfuric acid and diolefin; diolefin oligomer; water; and prepolymer. Water-soluble components are removed by dilution of the reaction mixture with water and decanting the aqueous phase. From this phase urea, sulfuric acid, and prepolymer may readily be recovered for recycling to succeeding preparations of the polymer.

From the remainder of the reaction mixture, comprising a diluent solution of unreacted diolefin, diolefin oligomer, diluent-soluble polymer and, usually some precipitated polymer, the polymer may be recovered either as the sulfuric acid half ester or in the form of a salt thereof. The particular steps of the recovery process will vary, depending on whether the half ester or salt form is desired, on which diolefin was polymerized with urea, and on the diluent employed in the polymerization step. They will be better understood from a consideration of the following examples which are presented for illustrative purposes and not by way of limitation.

Example 1

A. Formation of polymer.—To a vigorously agitated suspension of 30 grams urea (0.5 mol), ground to a fine powder, in 200 ml. cyclohexane there was added 40.4 ml. 96.8% sulfuric acid (0.75 mol) over a period of 15 minutes under a blanket of nitrogen and at a temperature of 10–13° C. Cooling was discontinued and the slurry stirred for about 45 minutes, allowing the temperature to rise to 25° C. Cyclohexane (190 ml.) was removed and replaced with 210 ml. methylene chloride.

The temperature was lowered to 10° C., the nitrogen flow stopped, and butadiene bubbled into the agitated urea-acid slurry at a rate of 7.5 standard liters per hour. The temperature was held at 10° C. for the first two hours and then allowed to rise to 20° C. while continuing the addition of butadiene for an additional 2.5 hours until 1.5 mols had been added. As the butadiene was taken up the color of the slurry changed from white to yellow to orange to red to very dark brick red. When about a third of the butadiene had been added a grainy precipitate began to appear. As the reaction continued, considerable viscous flocculent polymer phase developed. The butadiene flow was stopped and slow nitrogen flow resumed while the mass was agitated an additional hour to consume all possible dissolved butadiene.

B. Recovery of polymer.—While maintaining the temperature of the reaction product at 25–30° C., 100 ml. water was added to lower the acid concentration, whereupon the precipitated polymer dissolved (and/or stably dispersed) in the methylene chloride phase. The liquid layers were allowed to separate and the aqueous phase discarded.

The dark colored methylene chloride layer was neutralized by adding powdered calcium hydroxide in increments, any excess thereof being converted to insoluble calcium carbonate by bubbling in carbon dioxide. The color of the liquid phase changed to yellow upon neutralization. Unreacted butadiene and solvent were distilled off and the residue heated to 70° C. at 50 millimeters pressure to remove all solvent. The viscous yellow residue was washed with cyclohexane to remove butadiene oligomers and the residue dispersed in 400 ml. hot methanol. After treating with more carbon dioxide to assure destruction of any unneutralized lime, inorganic salts (calcium sulfate and calcium carbonate) were filtered off, leaving a solution of the butadiene-urea polymer in methanol. Methanol was distilled off and the residue heated to 125° C. at 50 millimeters to remove residual solvent and water. The dried product was a light colored, friable resin, insoluble in water and weighing 62.4 grams (56 weight percent conversion on urea plus butadiene charged). Its analysis was as follows:

| | Percent |
|---|---|
| C | 58.88 |
| H | 8.38 |
| N | 5.80 |
| S | 5.82 |
| Ca | 2.82 |
| Iodine No. | 125 |
| Acid No. | 50 |

From these analyses the average composition of the polymer, per urea group, was calculated to be 5.7 units from butadiene, 0.83 sulfate groups, 0.33 calcium ion, 0.75 $H_2O$ and 2.3 carbon to carbon double bonds.

Example 2

A. Formation of polymer.—The process of Example I (part A) was repeated with the following variations. The urea-sulfuric acid slurry was prepared directly in 210 ml. methylene chloride. The butadiene (1.5 mols) was added more rapidly so that the total time of addition was 3 hours (2 hours at 10° C., 1 hour at 20° C.). The stirring time after addition of all the butadiene was only 15 minutes instead of an hour.

B. Recovery of polymer.—The reaction product was diluted with 100 ml. water as in Example I and the aqueous phase discarded. The methylene chloride layer was washed twice with 75 ml. portions of water, the washings being discarded. The remaining dark, slightly cloudy, methylene chloride layer was neutralized by adding solid $NaHCO_3$. The color of the solution changed to a lemon yellow. Methylenechloride was distilled off (along with much unreacted butadiene). Last traces of $CH_2Cl_2$ were removed by vacuum distillation at 20 mm. and 60–80° C. (liq.). The yellow, viscous resin was placed in a glass vessel and heated to 100° C. Vacuum was applied and steam sparged through the polymer. Ultimate pressure was 100 mm. and temperature was 70° C. The distillate comprised 660 ml. water and approximately 2 grams of a yellow liquid butadiene oligomer. The polymer residue was dried at 85° C. and 20–50 mm. to give 71 grams of yellow, friable solid. This corresponds to 64 wt. percent conversion of butadiene+urea charged. Polymer analysis was: N=4.13%, S=4.62%, Sulfated ash=17.5%, Acid No.=3.62, Iodine No.=132 and $H_2O$=2.6%. The product was soluble in water.

The discarded aqueous phase and washings contained unreacted urea, sulfuric acid and water-soluble low-molecular weight butadiene-urea condensates which could have been recovered and employed in the preparation of further copolymer if desired.

Example 3

An isoprene-urea polymer was prepared, employing the basic procedure exemplified in step A of the foregoing examples with minor variations. Specifically, the following conditions were employed, on the basis of 0.5 mol urea.

Diluent _____ 210 ml. cyclohexane.
Sulfuric acid _____ 0.75 mol, 93% strength.
Isoprene added _____ 1.0 mol in 3 hours.
Temperature _____ 10° to 20° C.

The formed polymer was soluble in the cyclohexane layer after 100 ml. water had been added as in the preceding examples. It was recovered by neutralization with calcium hydroxide, filtration of the precipitated calcium sulfate, evaporation of solvent and vacuum stripping to a liquid temperature of 160–180° C. (5.7 millimeters pressure) to remove isoprene oligomer. The isoprene-urea polymer remaining, a yellow balsamic resinous product, was obtained in 47 weight percent conversion calculated on the urea plus isoprene charged. By calculation from its elemental analysis and iodine number it contained, per urea group, 6.7 units from isoprene, 0.4 acid-sulfate radicals, and 3 carbon to carbon double bonds.

Example 4

A second isoprene-urea polymer was prepared and recovered starting with 0.5 mol urea and following the same general scheme as in Example 3 with the variations indicated below.

Diluent _____ 210 ml. methylene chloride.
Sulfuric acid _____ 1.0 mol, 93% strength.
Isoprene added _____ 2.0 mols in 3 hours.
Temperature _____ 0–5° C.
Neutralizing base _____ $NH_4OH$.

Conversion to polymer was 61 weight percent based on urea plus isoprene charged and the composition, per urea group, calculated from the elemental analysis and iodine number, was: 16 units from isoprene, 0.5 acid-sulfate radicals and 7.5 carbon to carbon double bonds.

It is to be noted that the isoprene-urea polymers although containing acid sulfate groups do not take up base when solutions or suspensions containing them are neutralized. The product recovered is always in the free acid form.

Example 5

A third isoprene-urea polymer was prepared and recovered following the procedure described in Example 3 with the single exception that sulfuric acid of 85% concentration was employed in place of the 93% acid there shown. Under these conditions the conversion to polymer was only 15 weight percent of the urea plus isoprene charged. Its composition, calculated from analysis, was 8.5 units from isoprene, 0.2 acid sulfate groups, and 4 carbon to carbon double bonds per urea group.

Example 6

To a suspension of 30 grams urea (0.5 mol) in 200 ml. cyclohexane was added 70 grams of a mixture of sulfuric acid and sulfur trioxide, containing 105 equivalent percent of $H_2SO_4$, following the procedure described in Example 1. Into the resulting suspension, containing 0.75 mol acid and 0.5 mol urea, 0.58 mol butadiene were introduced over a period of 1.75 hours while controlling the temperature between 10° and 30° C. The reaction mixture was stirred in an atmosphere of nitrogen for an additional 1.25 hours after which 100 ml. water was added to dilute the excess acid. The reaction mixture at this point comprised a solid resin phase and two liquid phases. The latter two were discarded. The solid was suspended in water and neutralized with calcium hydroxide to pH 8. Excess lime was converted to calcium carbonate by addition of carbon dioxide. The solids were collected by filtration and the calcium salt of the resinous polymer extracted away from precipitated $CaSO_4$ and $CaCO_3$ with successive portions (200 ml. and 150 ml.) of boiling methanol. The methanol was distilled off and the resin dried at 125° C. under a pressure of 40 millimeters. The recovered product (16% by weight of the charged urea plus butadiene) was an orange, brittle resin melting at 145 to 160° C. Its composition, calculated from its analysis, was 5.3 units from butadiene, 0.7 sulfate group, 0.3 calcium atom and 1.7 carbon to carbon double bonds per urea group.

Example 7

A polymer of isoprene and urea was prepared and recovered following the general procedure of Example 4 with the following indicated variables:

Diluent _____ Cyclohexane.
Sulfuric acid _____ 0.5 mol, 96% strength.
Isoprene added _____ 0.6 mol in 3 hours.
Temperature _____ 10° to 25° C.

The recovered polymer (45 weight percent on basis of urea plus isoprene charged) was a clear, light yellow, extremely sticky balsam. Its analytical constants were:

N _____ percent__ 5.47
S _____ do____ 1.72
Acid No. _____ 11.0
Iodine No. _____ 118
Soluble sulfate _____ Negative Example 8

The process of Example 3 was repeated except that the sulfuric acid employed was of 96% strength and instead of isoprene an equimolar mixture of butadiene and isoprene was introduced into cyclohexane slurry of urea and sulfuric acid. The conversion to diolefin-urea copolymer was 37% by weight based on urea plus diolefin charged and, by calculation from its analysis it was found to contain per urea residue, 8 units from the mixed diolefin, 1.2 sulfate groups and 4 carbon to carbon double bonds. The product was a viscous liquid, soluble in cyclohexane.

When instead of an equimolar mixture of butadiene and isoprene a mixture containing 75 mol percent butadiene and 25 mol percent isoprene were reacted with urea-sulfuric acid slurry in the same manner there was obtained in 47% by weight conversion a solid copolymer, soluble in cyclohexane and melting at 40–50° C. It contained per mol of urea, 6 units from diolefin, 1.0 sulfate radical and 2.3 carbon to carbon double bonds.

Example 9

A suspension of 0.125 mol urea and 0.313 mol sulfuric acid in 300 ml. methylene chloride, was prepared, following the procedure described in Example 2. Butadiene, 1 mol, was added over a 4.5 hour period while maintaining the temperature at 10–20° C. After addition of water to dilute the acid and solubilize the former polymer in the methylene chloride layer, the latter was separated and the formed polymer recovered therefrom by the process described in Example 1. The conversion, based on urea plus butadiene charged, was 60% by weight and the polymer melted at 120–160° C. Analysis yielded the following figures:

|   | Percent |
|---|---|
| C | 60.86 |
| H | 8.63 |
| N | 5.3 |
| S | 6.37 |
| Ca | 2.74 |

Iodine No.: 108.

By calculation from these values we obtain that the polymer contained, per urea residue, 6.5 units from butadiene, 1.1 sulfate groups, 0.36 calcium atom and 2 carbon to carbon double bonds.

A series of experiments was run to determine the effect of various diluents on the extent of conversion in the urea diolefin reaction. The conditions common throughout the series were: acid strength=96%; acid/urea mol ratio=1.5; temperature=10–20° C.; time of addition=2–3 hours. In each case the urea-acid slurry was first prepared in cyclohexane and replaced by the test diluent according to the procedure described in Example 1. The variable conditions and the corresponding conversion extents are tabulated below.

| Example No. | Diluent | Ml. Diluent per Mol Urea | Salt of Polymer | Conversion to Polymer, Percent |
|---|---|---|---|---|
| 10 | CHCl$_3$ | 420 | Ca | 48 |
| 11 | CCl$_4$ | 420 | Ca | 29 |
| 12 | CH$_3$CHCl$_2$ | 420 | Ca | 34 |
| 13 | C$_6$H$_5$Cl | 840 | Ca | 36 |
| 14 | CCl$_3$CF$_3$ | 420 | Ca | 45 |
| 15 | CClF$_3$ | 420 | Na | 32 |
| 16 | n-Hexane | 420 | Na | 45 |

Example 17

Urea, 0.5 mol, and methylene chloride, 210 ml., were stirred at 10° C. while 96.8% sulfuric acid, 0.75 mol, was added as in Example 2. The temperature was adjusted to 25° C. and butadiene, 1.5 mols, metered into the stirred mixture over a 2 hour period. After stirring an additional fifteen minutes the precipitated polymer was recovered following the procedure described in Example 2 with the single exception that the steam sparging to remove butadiene oligomer was effected at 100° C. at atmospheric pressure. The polymer recovered (sodium salt) weighed 75 grams (67.4% conversion) and was a crisp, friable, light yellow solid which contained 4.84% nitrogen, 5.16% sulfur and had an iodine number of 120.

The aqueous phase and washings separated in the recovery process were combined and found to contain 13.5% of the charged urea as free urea, 53% of the charged urea as water-soluble prepolymer and 75% of the charged sulfuric acid.

Sufficient urea was added to a portion of the solution to increase the mol ratio of urea to sulfuric acid to 1.2 and the mixture concentrated at a temperature of 60° C. and under reduced pressure to a viscous clear orange liquid containing, by analysis, 3.88% water, 0.37 mol free urea, 0.252 mol urea in the form of prepolymer, and 0.517 mol sulfuric acid. The concentrate was stirred into 210 ml. methylene chloride and a mixture of 24.8 grams of 96% sulfuric acid and 15 grams of 20% oleum added at 20° C. over a period of 15 minutes to adjust the overall ratio of sulfuric acid to urea to a value of 1.5 and the acid concentration to 96%.

Butadiene was then added at a rate sufficient to introduce 3 mols thereof per mol of total urea over a period of 3 hours while maintaining the temperature at 20° C.

The formed urea-butadiene polymer was isolated as sodium salt in the manner described in the first stage of this example. The resin yield was 140 grams per mol of urea, containing 4.56% nitrogen and 4.85% sulfur. Its iodine number was 135.

Example 18

Urea, 0.5 mol, was suspended in 120 ml. cyclohexane along with powdered TiO$_2$, 0.4 gram, as suspending agent. While maintaining the temperature at 10° C., 96% sulfuric acid, 0.4 mol, was added over a period of 15 minutes. The slurry was stirred an additional 45 minutes while the temperature rose to 23° C. Isoprene, 0.5 mol, was added dropwise over a period of 3 hours, maintaining the temperature at 25° C. during the first hour and at 30–33° the remainder of the time. Stirring was continued for an additional 15 minutes at which time the reactor contents comprised a dark red cyclohexane solution and a viscous, dark red polymer phase which adhered to the walls of the vessel. Water, 50 ml., was added at 30° C. whereupon two liquid phases formed, the polymer dissolving in the cyclohexane layer. The clear red cyclohexane layer was removed and shaken with concentrated ammonia to neutralize the excess acid. The color changed to a light yellow. Cyclohexane was removed by distillation at atmospheric pressure and the residue heated to 165° C. at 5 millimeters pressure to distill out 2 grams of isoprene oligomer. The residual polymer was a light, yellow, soft, sticky resin weighing 20.8 grams (32% conversion) which contained 5.96% N and had an iodine number of 56.

Example 19

To a slurry of 303 grams urea (5 mols) and 96% sulfuric acid (7.5 mols) in 2777 grams of methylene chloride, prepared by the technique described in Example 2, there was added 808 grams butadiene (15 mols) over a period of 3.2 hours while maintaining the temperature at 10° C. for the first two hours and at 20° C. for the remainder of the time. The reaction mixture was stirred an additional hour at 20° C. and diluted with a kilogram of water. The aqueous layer was discarded and the methylene chloride layer washed with three successive portions of water. Calcium hydroxide, 3.0 grams, was added to neutralize residual sulfuric acid and methylene chloride removed by distilling to a top temperature of 65° C. at atmospheric pressure. Fluidity of the concentrating resin solution was maintained by adding a kilogram of cyclohexane during the concentration. Butadiene oligomer was extracted from the crude resin product by successive washings with one liter portions of hexane, adding 250 ml. of water after the first washing to maintain mobility of the polymer phase. Residual hexane was stripped therefrom by heating to 95° C. under vacuum and the resin separated from the inorganic salt by successive extraction with hot methanol and methylene chloride. On evaporation to dryness there was recovered a total of 642 grams resin, corresponding to a conversion of 57.8%. It contained an average of 7.5 groups from butadiene and 1.0 acid sulfate group per urea groups and was virtually ash-free.

Example 20

A slurry of 303 grams urea (5 mols) and 765 grams 96% sulfuric acid (7.5 mols) in a mixed diluent comprising 914 grams methylene chloride and 1044 grams cyclohexane was prepared following the general procedure outlined in Example 2. Under vigorous agitation 1020 grams isoprene (15 mols) was added gradually over a period of 3 hours while controlling the temperature at 10° C. during the first 2 hours and at 20° C. thereafter. Stirring was continued for one hour after all the isoprene had been added. The reaction mixture was diluted with 1000 grams of water and the layers separated. The organic layer was treated with 15.4 grams calcium hydroxide to convert residual sulfuric acid to CaSO$_4$ and the slurry carbonated to destroy excess lime. After filtration, 0.5 grams di-t-butylhydroquinone was added to inhibit double bond polymerization. Solvent and isoprene oligomer were removed by distillation to terminal conditions of 138° C. (vapor temperature) and 3 millimeters pressure.

The polymer residue weighed 849 grams (64.2% conversion) and was a reddish brown balsam melting over a range of 27° to 34° C. It was ash free, contained 1.06% nitrogen, 1.54% sulfur and had an iodine number of 156. From these values it is calculated that the polymer contained, per urea residue, 36.6 units from isoprene, 1.27 acid sulfate groups and 16.2 carbon to carbon double bonds.

Example 21

To 30 grams (0.5 mol) of urea suspended in a mixture of 140 ml. cyclohexane and 60 ml. methylene chloride, 40.4 ml. (0.75 mol) of 96.8% sulfuric acid was added over a period of 15 minutes and stirred for an additional 45 minutes under a nitrogen atmosphere while maintaining the temperature at 20° C. A mixture of 45.5 grams (0.67 mol) isoprene and 21.8 grams (0.33 mol) freshly distilled cyclopentadiene was added gradually over a period of 3 hours while maintaining the temperature at 10–15° C. During this addition the color changed to a dark red very quickly and ultimately became nearly black. The reaction mixture was stirred an additional half hour at 10° C. and then diluted with 75 ml. water. The aqueous layer was discarded and the organic layer washed with two 75 ml. portions of water.

The organic layer was neutralized with $NaHCO_3$ after addition of 50 ml. water. The clear aqueous layer was discarded and the clear red organic layer distilled to remove solvent and any unreacted olefin. Steam sparging at 100° C. and atmospheric pressure removed 2 grams of hydrocarbon oligomer. The residue was taken up in 300 ml. methylene chloride to form a dark red solution which was poured into 1700 ml. stirred acetone. 13.5 grams of a light tan resin melting above 300° C. precipitated. The acetone-soluble portion on evaporation of solvent yielded 54 grams of a dark red, crisp solid melting at 80–90° C. Analyses of the two portions yielded the following results:

|  | Acetone, Sol. Portion | Acetone, Insol. Portion |
|---|---|---|
| N, percent | 3.36 | 2.51 |
| S, percent | 2.82 | 2.52 |
| Ash (Sulfated), percent | 0.3 | 0.16 |
| Iodine No | 120 | 117 |
| Acid No | 43 | 49 |

Infra red spectra of both portions exhibited, in addition to the lines characteristic of unmodified isoprene-urea polymers, absorption lines attributable to groups from cyclopentadiene, indicating co-reaction of both olefins in the polymer formation.

Example 22

Step A of Example 2 was repeated with the exception that 37 grams (0.5 mol) N-methyl urea was employed instead of 30 grams (0.5 mol) urea. After dilution with water and separating phases in accordance with the process described in the earlier examples methylene chloride was distilled from the organic layer and the residue steam-sparged in aqueous suspension to remove 6.6 grams of butadiene oligomer. The residue was dried at 85° C. and 50 mm. pressure to yield 25 grams of a sticky yellow resin. Its infra red absorption curve was very similar to those exhibited by urea-butadiene polymers with the single exception that it also showed a weak absorption band at 7.07 microns, characteristic of the $CH_3$-N group in methyl urea.

Example 23

Step A of Example 2 was repeated with the exception that a mixture of three parts butadiene and one part isobutylene by volume were employed instead of straight butadiene and a total of 4 mols of the olefin mixture were introduced into the urea-sulfuric acid suspension. After dilution with water and separation of phases the methylene chloride phase was neutralized with sodium bicarbonate, distilled to remove diluent and olefin, and steam-stripped free of oligomer.

The polymeric residue was a soft resin melting at about 30° C. and was obtained in 47% conversion. It contained 3.28% nitrogen and had an iodine number of 130. Unlike the unmodified butadiene-urea polymers it was soluble in hexane and only poorly soluble in water. Its infra red spectrum showed, in addition to the lines characteristic of the urea-butadiene polymers, absorption attributable to t-butyl groups and increased absorption due to trans carbon to carbon double bonds. These effects indicate that a copolymerization of butadiene and isobutylene with the urea had taken place.

If, in the foregoing example, an equimolar mixture of butadiene and isobutylene is employed, a softer, lower melting polymer is obtained which is quite insoluble in water and readily soluble in non-polar solvents.

The foregoing examples illustrate batch-wise preparation of copolymers in accordance with the invention. The copolymerization reaction is rapid and obviously the process can be adapted to continuous operation. A stream of premixed slurry of urea and sulfuric acid in diluent, which may also contain urea, prepolymer and/or sulfuric acid from a previous run is continuously metered into one end of a reactor together with a proportioned stream of diolefin which may, if desired, be introduced at a plurality of points in the system. After a short residence time, reaction mixture is continuously passed from the other end of the reactor to a separation chamber into which diluting water is metered. From this chamber the organic and aqueous phases are separately withdrawn. From the organic phase the resinous copolymer is recoverable by one of the processes detailed in the foregoing illustrative examples, the separated diluent and any unreacted diolefin being recycled to the process. From the aqueous phase sulfuric acid, urea and prepolymer may, if desired, be recovered and recycled. In such recovery at least sufficient urea is added to furnish an excess of urea over sulfuric acid and the solution concentrated under reduced pressure. The concentrate is adjusted to the desired urea-sulfuric acid-water ratio for return to the reactor run by addition of the separate components as required.

Polymers having a considerable range of compositions and properties are obtainable by the process of the invention. In general, they comprise, per molar proportion of urea residue from 2 to 50 molar proportions of diolefin residue and from about 0.1 to about 1.5 sulfate radicals. They are remarkably stable to hydrolysis in either strong base or strong acid at elevated temperatures.

In physical form the isoprene-urea polymers are soft and tacky at ordinary temperatures while the butadiene-urea polymers are generally hard and friable, exhibiting melting points of from 80° C. to 150° C. Copolymers containing both butadiene and isoprene exhibit physical properties intermediate between those containing the separate diolefins.

Isoprene-urea polymers are soluble in benzene, cyclohexane, acetone, the lower monohydric alcohols and chlorinated solvents such as carbon tetrachloride or methylene chloride. They are insoluble in water and in aqueous solutions of acid and alkali. An aqueous suspension of the polymer is acidic and appears to consume alkali in titration. When the neutralized suspension is filtered, and washed, however, the recovered polymer is in the acid form. Apparently the neutralizing alkali is held by weak adsorption forces and is readily washed out.

In contrast, the butadiene-urea polymers may be obtained in the form of the free acid or as salts of inorganic bases or amines. Both the free acids and their inorganic salts are soluble in the lower monohydric alcohols and in pyridine but insoluble in benzene, cyclohexane and glacial acetic acid. The alkali metal and ammonium salts are soluble in water but the free acid and higher valent metal salts are, in general, water insoluble. In methylene chloride the acid form of the butadiene-urea polymers is soluble but the salts are only slightly soluble. Mixtures of methanol and methylene chloride are superior solvents for the diolefin-urea polymers in either the free acid or salt form.

The chemical structure of the polymers has not been fully elucidated. Examination by infra red spectroscopy shows the presence of organically combined radicals from an oxy acid of sulfur. That the radicals are sulfate rather than sulfonate is indicated by the fact that the polymers, on fusion with KOH yield $K_2SO_4$ rather than $K_2SO_3$. Analysis of the infra-red curves shows, in addition to unreacted

that the grouping

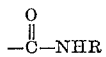

is present in all of the polymers and that, in the isoprene-urea polymers, a substantial amount of dialkylation to form

occurs. This latter grouping is not found in the butadiene-urea polymers. Also the isoprene urea polymers show infra-red absorption peaks characteristic of the groups

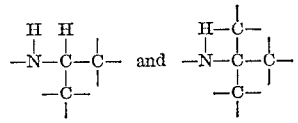

from which it is evident that both the secondary and tertiary olefin linkages of isoprene have been reactive in alkylating the urea. The existence of carbon to carbon double bonds in the polymers is evidenced by the fact that they all exhibit substantial iodine numbers. From the infra red curves it is seen that internal, rather than terminal, double bonds predominate.

The polymers of the invention are useful in manner suggested by their physical and chemical attributes. For example, an isoprene-urea polymer prepared as described in Example 7, cross linked with formaldehyde, is an excellent wet-strength resin for paper.

Both isoprene-urea and butadiene-urea polymers are useful modifiers of other resinous, elastomeric, or plastic compositions. By way of illustration, incorporation of an isoprene-urea polymer into a styrenated fumarate polyester of bisphenol propylene glycol ether at the 10% level shortened the gel time by 25% and increased the adhesion of the cured resin to glass markedly. Similarly the incorporation of 8% of the sodium salt of a butadiene-urea polymer in a butylated urea-formaldehyde alkyd resin improved the water resistance of films laid down therefrom. Incorporation of the polymers in polyurethane compositions has been found to increase the hydrolytic stability and solvent resistance of the cured products.

The water-soluble salts of the butadiene-urea polymers and butadiene-isobutylene-urea copolymers of the invention are surface active in character and have utility as wetting penetrating and emulsifying agents, and as detergents. They are non-toxic and non-irritating to the skin and, in detergent formulations, yield low sudsing compositions.

What is claimed is:

1. A process for preparing a resinous product which comprises (1) preparing a suspension of a urea containing at least one —$NH_2$ group attached directly to carbonyl and from 0.75 to 3.0 molar proportions of a sulfuric acid solution containing from 85 to 105 percent by weight of equivalent $H_2SO_4$ in an inert organic diluent; (2) introducing into the said suspension, with continuous agitation and at a temperature of from —10° to 70° C., from 0.8 to 10 molar proportions of an acyclic 1,3-diolefin containing (i) from 4 to 7 carbon atoms and (ii) only terminal carbon to carbon double bonds and (iii) being branched at no more than one carbon atom; and (3) recovering the resinous product, all of said molar proportions being per molar proportion of said urea.

2. A resinous product prepared by the process of claim 1.

3. A process for preparing a resinous product which comprises: (1) preparing a suspension of urea and from 0.75 to 3.0 molar proportions of a sulfuric acid solution containing from 85 to 105 percent by weight of equivalent $H_2SO_4$ in an inert organic diluent; (2) introducing into the said suspension, with continuous agitation and at a temperature of from —10° to 70° C., from 0.8 to 10 molar proportions of a mixture of olefins of which at least 40 mol percent is an acyclic 1,3-diolefin containing (i) from 4 to 7 carbon atoms and (ii) only terminal carbon to carbon double bonds and (iii) branched at no more than one carbon atom, and the remainder is isobutylene; (3) diluting the resulting reaction mixture with water; and (4) recovering the resinous product from the nonaqueous portion of the reaction mixture, all of the said molar proportions being per molar proportion of urea.

4. A process for preparing a sulfated butadiene-urea polymer which comprises (1) preparing a suspension of urea and from 1 to 2 molar proportion of a sulfuric acid solution containing from 92 to 98 percent by weight of $H_2SO_4$ in methylene chloride; (2) introducing into the said suspension, with continuous agitation and at a temperature of from 10° to 45° C., from 1.5 to 5.0 molar proportions of butadiene; (3) diluting the resulting reaction mixture with water; and (4) recovering the sulfated butadiene-urea polymer from the methylene chloride phase, all of the said molar proportions being per molar proportion of urea.

5. A sulfated butadiene-urea polymer prepared by the process of claim 4.

6. A process as in claim 4 wherein the said methylene chloride phase from step (3) is neutralized with an inorganic base and the polymer recovered as an inorganic salt of a sulfuric acid half ester.

7. A process as in claim 6 wherein the said inorganic base is selected from the group consisting of sodium hydroxide, sodium carbonate and sodium bicarbonate.

8. A process for preparing a sulfated urea-butadiene-isobutylene copolymer which comprises (1) preparing a suspension of urea and from 1.0 to 2.0 molar proportions of a sulfuric acid solution containing from 92 to 98 percent by weight of $H_2SO_4$ in methylene chloride; (2) introducing into the said suspension, with continuous agitation and at a temperature of from 10° to 45° C., from 1.5 to 5.0 molar proportions of a mixture of butadiene and isobutylene containing at least 40 mol percent of butadiene; (3) diluting the resulting reaction mixture with water; and (4) recovering the sulfated urea-butadiene-isobutylene copolymer from the formed methylene chloride phase, all of the said molar proportions being per molar proportion of urea.

9. A sulfated urea-butadiene-isobutylene copolymer prepared by the process of claim 8.

10. A process for preparing a sulfated isoprene-urea polymer which comprises (1) preparing a suspension of urea and from 1 to 2 molar proportions of a sulfuric acid solution containing from 92 to 98 percent by weight of $H_2SO_4$ in a mixture of methylene chloride and cyclohexane; (2) introducing into the said suspension, with continuous agitation and at a temperature of from 10° to 45° C., from 1.5 to 5.0 molar proportions of isoprene; (3) diluting the resulting reaction mixture with water, and (4) recovering the sulfated isoprene-urea polymer from the formed organic liquid phase, all of the said molar proportions being per molar proportion of urea.

11. A process for preparing a sulfated urea-butadiene-isoprene copolymer which comprises (1) preparing a suspension of urea and from 1 to 2 molar proportions of a sulfuric acid solution containing from 92 to 98 percent by weight of $H_2SO_4$ in a mixture of methylene chloride and cyclohexane; (2) introducing into the said suspension, with continuous agitation and at a temperature of from 10° to 45° C., from 1.5 to 5 molar proportions of a diolefin consisting essentially of a mixture of isoprene and butadiene; (3) diluting the resulting reaction mixture with water; and (4) recovering sulfated urea-butadiene isoprene copolymer from the formed organic liquid phase, all of the said molar proportions being per molar proportion of urea.

References Cited

UNITED STATES PATENTS

| | | | |
|---|---|---|---|
| 2,247,495 | 7/1941 | Harvey et al. | 260—553 |
| 2,548,585 | 4/1951 | Brown | 260—553 |
| 2,849,485 | 8/1958 | Massie | 260—553 |
| 2,849,488 | 8/1958 | Ambelang et al. | 260—553 |

FOREIGN PATENTS 650,872    7/1965    Netherlands.

DONALD E. CZAJA, *Primary Examiner.*
F. McKELVEY, *Assistant Examiner.*